United States Patent
Hattori

(10) Patent No.: US 12,491,819 B2
(45) Date of Patent: Dec. 9, 2025

(54) ELEMENT DEVICE AND VISUAL RECOGNITION DEVICE

(71) Applicant: KABUSHIKI KAISHA TOKAI-RIKA-DENKI-SEISAKUSHO, Aichi-ken (JP)

(72) Inventor: Tomomi Hattori, Aichi (JP)

(73) Assignee: KABUSHIKI KAISHA TOKAI-RIKA-DENKI-SEISAKUSHO, Aichi-ken (JP)

(*) Notice: Subject to any disclaimer, the term of this patent is extended or adjusted under 35 U.S.C. 154(b) by 423 days.

(21) Appl. No.: 18/254,313

(22) PCT Filed: Oct. 20, 2021

(86) PCT No.: PCT/JP2021/038805
§ 371 (c)(1),
(2) Date: May 24, 2023

(87) PCT Pub. No.: WO2022/113581
PCT Pub. Date: Jun. 2, 2022

(65) Prior Publication Data
US 2024/0010127 A1    Jan. 11, 2024

(30) Foreign Application Priority Data
Nov. 26, 2020    (JP) .................................. 2020-196329

(51) Int. Cl.
*B60R 1/06* (2006.01)
*B60Q 1/24* (2006.01)
(Continued)

(52) U.S. Cl.
CPC .................. *B60R 1/06* (2013.01); *B60Q 1/24* (2013.01); *B60R 1/12* (2013.01); *F21V 29/503* (2015.01); *B60R 2001/1253* (2013.01)

(58) Field of Classification Search
CPC ..... B60R 1/06; B60R 1/12; B60R 2001/1253; B60Q 1/24; F21V 29/503
(Continued)

(56) References Cited

U.S. PATENT DOCUMENTS 6,959,994 B2 * 11/2005 Fujikawa .................. B60R 1/25
   348/148
8,041,209 B2 * 10/2011 Watanabe ............... B60R 11/04
   396/429

(Continued)

FOREIGN PATENT DOCUMENTS

| JP | 2014038731 A | 2/2014 |
| JP | 2019220424 A | 12/2019 |
| JP | 2020019304 A | 2/2020 |

OTHER PUBLICATIONS

International Search Report (with English translation) of PCT/JP2021/038805, mailed on Dec. 14, 2021, 4 pages.

*Primary Examiner* — Ricky D Shafer
(74) *Attorney, Agent, or Firm* — Dority & Manning, P.A.

(57) ABSTRACT

In an illumination device, heat generated by a light emitting element is transmitted to a flexible circuit board, a first reinforcement plate, a heat dissipation seal, and a coupling portion of a housing box upper wall, and discharged upward from the coupling portion. A projection portion of a case projects further upward than the coupling portion, and a male connector housed in the projection portion is disposed at a position not opposing an upper surface of the coupling portion. This means that the male connector and the projection portion can be suppressed from impeding a convection current of heat discharged upward from the coupling portion, enabling good discharge of heat generated by the light emitting element upward from the coupling portion.

12 Claims, 10 Drawing Sheets

(51) Int. Cl.
*B60R 1/12* (2006.01)
*F21V 29/503* (2015.01)

(58) Field of Classification Search
USPC .................................. 359/841, 872; 362/494
See application file for complete search history.

(56) References Cited

U.S. PATENT DOCUMENTS

| | | | | |
|---|---|---|---|---|
| 8,208,023 | B2* | 6/2012 | Asai ..................... | B60R 11/04 |
| | | | | 348/148 |
| 11,173,844 | B2* | 11/2021 | Kawanishi ............ | B60R 1/1207 |
| 2003/0098908 | A1* | 5/2003 | Misaiji ................... | B60R 11/04 |
| | | | | 348/148 |
| 2003/0103142 | A1* | 6/2003 | Hitomi ................... | B60R 11/04 |
| | | | | 348/148 |
| 2015/0036371 | A1* | 2/2015 | Ichikawa ............. | B60Q 1/2665 |
| | | | | 362/511 |
| 2017/0066386 | A1* | 3/2017 | Sawada ................ | B60Q 1/2665 |
| 2017/0371235 | A1* | 12/2017 | Yokoyama ............. | F21S 43/26 |
| 2018/0297512 | A1* | 10/2018 | Nakayama ......... | G02B 19/0061 |
| 2019/0270403 | A1* | 9/2019 | Sobecki ............. | G03B 21/2033 |
| 2019/0390830 | A1 | 12/2019 | Hatanaka et al. | |
| 2020/0114825 | A1* | 4/2020 | Messenger .............. | F21S 43/14 |
| 2021/0012123 | A1* | 1/2021 | Kim ....................... | G06V 10/60 |

* cited by examiner

ELEMENT DEVICE AND VISUAL RECOGNITION DEVICE

CROSS-REFERENCE TO RELATED APPLICATIONS

The present application is a US national phase entry of International Patent Application No. PCT/JP2021/038805, filed on Oct. 20, 2021, which is based upon and claims the right of priority to JP 2020-196329, filed on Nov. 26, 2020, both of which are hereby incorporated by reference herein in their entirety for all purposes.

TECHNICAL FIELD

The present invention relates to an element device and a visual recognition device including an element body that emits light or captures an image.

BACKGROUND ART

A light source unit described in Japanese Patent Application Laid-Open (JP-A) No. 2020-19304 includes, for example, an infrared light source housed in a case made from metal and a lens, with the infrared light source supported by a base plate, made from metal for example, and coupled to a lid portion of the case through a second metal body and a resin body on an opposite side of the base plate to the infrared light source. A terminal section is provided at the lid portion, with the terminal section electrically connected to the infrared light source and also electrically connected to a vehicle side. Moreover, a projection portion is integrally formed to the lid portion, with the projection portion housing the terminal section. A mounting portion of the lid portion is mounted to a projection on the vehicle side, and the projection opposes on an opposite side of the lid portion to the base plate.

In such a light source unit, heat generated by the infrared light source is transmitted to the lid portion via the base plate, the second metal body, and the resin body.

SUMMARY OF INVENTION

Technical Problem

In consideration of the above circumstances, an object of the present invention is to obtain an element device and a visual recognition device that enable good discharge of heat generated by an element body from a coupling portion.

Solution to Problem

An element device of a first aspect of the present invention includes a housing body provided at a vehicle, an element body that emits light or captures an image and that is housed in the housing body, a support body that is made from a metal and that supports the element body, a coupling portion that configures the housing body and that is made from a metal and coupled to the support body at an opposite side from the element body, a projection portion that is provided at the housing body and that projects further than the coupling portion toward the opposite side from the support body, and a connector that is housed in the projection portion and that is disposed at a position not opposing an opposite side of the coupling portion from the support body, is electrically connected to the element body, and is also electrically connected to a vehicle side.

An element device of a second aspect of the present invention is the element device of the first aspect of the present invention, wherein an electrical connection direction of the connector to the vehicle side is not toward a side of the coupling portion.

An element device of a third aspect of the present invention is the element device of the first aspect or the second aspect of the present invention, further including a mounted portion provided at the housing body, disposed at a position not opposing an opposite side of the coupling portion from the support body, and configured to be mounted to the vehicle side.

An element device of a fourth aspect of the present invention is the element device of the third aspect of the present invention, further including a transmitting body that transmits light, the transmitting body configures the housing body and covers an opposite side of the element body from the support body, and the mounted portion being provided at the transmitting body.

A visual recognition device of a fifth aspect of the present invention includes a cover body that is provided externally to a vehicle and that is provided with a passage member including a passage portion, a visual recognition mechanism that is covered by the cover body and that assists visual recognition of an occupant of the vehicle, an element device, and a mounting portion. The element device is provided with a housing body housed in the cover body, an element body housed in the housing body, and emitting light or capturing an image for light able to pass via the passage portion to or from outside of the cover body, a support body made from a metal and supporting the element body, and a coupling portion configuring the housing body, and made from a metal, coupled to the support body at an opposite side from the element body, and also separated from the cover body other than the passage member. The mounting portion is provided at the passage member, and is disposed at a position not opposing an opposite side of the coupling portion from the support body, and at which the housing body is mounted.

A visual recognition device of a sixth aspect of the present invention includes a cover body that is provided externally to a vehicle and that is provided with a passage member including a passage portion, a visual recognition mechanism that is covered by the cover body and that assists visual recognition of an occupant of the vehicle, an element device, and a mounting portion. The element device is provided with a housing body housed in the cover body, an element body housed in the housing body and emitting light or capturing an image for light able to pass via the passage portion to or from outside of the cover body, a support body made from a metal and supporting the element body, and a coupling portion configuring the housing body, made from a metal, coupled to the support body at an opposite side from the element body, and also separated from the cover body other than the passage member. The mounting portion is provided at the cover body other than the passage member, and is disposed at a position not opposing an opposite side of the coupling portion from the support body, and at which the housing body is mounted.

A visual recognition device of a seventh aspect of the present invention is the visual recognition device of the fifth aspect or the sixth aspect of the present invention, wherein members at a side of the cover body do not ingress into a space that is on the opposite side of the coupling portion from the support body and that is on a coupling portion side of a projection section of the housing body projecting further than the coupling portion toward the opposite side from the support body.

Advantageous Effects of Invention

In the element device of the first aspect of the present invention, the housing body is provided at the vehicle, the element body is housed in the housing body, and the metal support body supports the element body. The connector is electrically connected to the element body and is also electrically connected to the vehicle side, and the element body emits light or captures an image. Moreover, the projection portion is provided at the housing body and the connector is housed in the projection portion.

Furthermore, the coupling portion made from a metal configures the housing body, and the coupling portion is coupled to the support body at the opposite side from the element body. This means that heat generated by the element body is transmitted to the coupling portion via the support body, and is discharged from the coupling portion.

The projection portion projects further than the coupling portion toward the opposite side from the support body, and the connector housed in the projection portion is disposed at a position not opposing the opposite side of the coupling portion from the support body. This thereby enables the connector and the projection portion to be suppressed from opposing the coupling portion at the opposite side from the support body, enabling the connector and the projection portion to be suppressed from impeding a convection current of the heat discharged from the coupling portion, and enabling good discharge of heat generated by the element body from the coupling portion.

In the element device of the second aspect of the present invention, the electrical connection direction of the connector to the vehicle side is not toward the coupling portion side. This means that the connector portion can be suppressed from opposing the coupling portion at the opposite side from the support body, enabling the connector portion to be suppressed from impeding a convection current of the heat discharged from the coupling portion, and enabling even better discharge of heat generated by the element body from the coupling portion.

In the element device of the third aspect of the present invention, the mounted portion of the housing body is mounted to the vehicle side.

The mounted portion is disposed at a position not opposing the opposite side of the coupling portion from the support body. This thereby enables the mounted portion to be suppressed from impeding a convection current of the heat discharged from the coupling portion, thereby enabling good discharge of heat generated by the element body from the coupling portion.

In the element device of the fourth aspect of the present invention, the transmitting body transmits light, configures the housing body and covers the opposite side of the element body from the support body.

The mounted portion is provided at the transmitting body. This thereby enables the mounted portion to be disposed at a position not opposing the coupling portion at the opposite side from the support body.

In the visual recognition device of the fifth aspect of the present invention, the cover body is provided externally to the vehicle, and the visual recognition mechanism is covered by the cover body and assists visual recognition of an occupant of the vehicle. Moreover, the passage member is provided at the cover body, and the mounted portion is provided at the passage member, and the element device is housed in the cover body.

In the element device, the housing body is mounted to the mounted portion, the element body is housed in the housing body, and the metal support body supports the element body. Light is able to pass between the element body and the outside of the cover body via the passage portion of the passage member, and the element body emits light or captures an image.

Furthermore, the metal coupling portion configures the housing body, the coupling portion is coupled to the support body at the opposite side from the element body. This means that heat generated by the element body is transmitted to the coupling portion via the support body, and is discharged from the coupling portion.

The coupling portion is separated from the cover body other than the passage member, and the mounting portion is disposed at a position not opposing the coupling portion from the opposite side from the support body. This thereby enables the mounting portion to be suppressed from opposing the coupling portion at the opposite side from the support body, enabling the mounting portion to be suppressed from impeding a convection current of the heat discharged from the coupling portion, and enabling good discharge of heat generated by the element body from the coupling portion.

In the visual recognition device of the sixth aspect of the present invention, the cover body is provided externally to the vehicle, and the visual recognition mechanism is covered by the cover body and assists visual recognition of an occupant of the vehicle. Moreover, the passage member is provided at the cover body, the mounted portion is provided other than to the passage member of the cover body, and the element device is housed in the cover body.

In the element device, the housing body is mounted to the mounting portion, and the element body is housed in the housing body and the metal support body supports the element body. Moreover, light is able to pass between the element body and the outside of the cover body via the passage portion of the passage member, and the element body emits light or captures an image.

Furthermore, the metal coupling portion configures the housing body, and the coupling portion is coupled to the support body at the opposite side from the element body. This means that heat generated by the element body is transmitted via the support body to the coupling portion, and discharged from the coupling portion.

The coupling portion is separated other than the passage member of the cover body, and the mounting portion is disposed at a position not opposing the coupling portion from the opposite side from the support body. This thereby enables the mounting portion to be suppressed from opposing the coupling portion at the opposite side from the support body, enables the mounting portion to be suppressed from impeding a convection current of the heat discharged from the coupling portion, and enables good discharge of heat generated by the element body from the coupling portion.

In the visual recognition device of the seventh aspect of the present invention, the members at the cover body side do not ingress into a space that is on the opposite side of the coupling portion from the support body and that is on the coupling portion side of the projection section of the housing body projecting further than the coupling portion toward the opposite side from the support body. This means that the members at the cover body side can be suppressed from impeding a convection current of the heat discharged from the coupling portion, enabling effective discharge of heat generated by the element body from the coupling portion.

DESCRIPTION OF EMBODIMENTS

First Exemplary Embodiment

Figure 1:
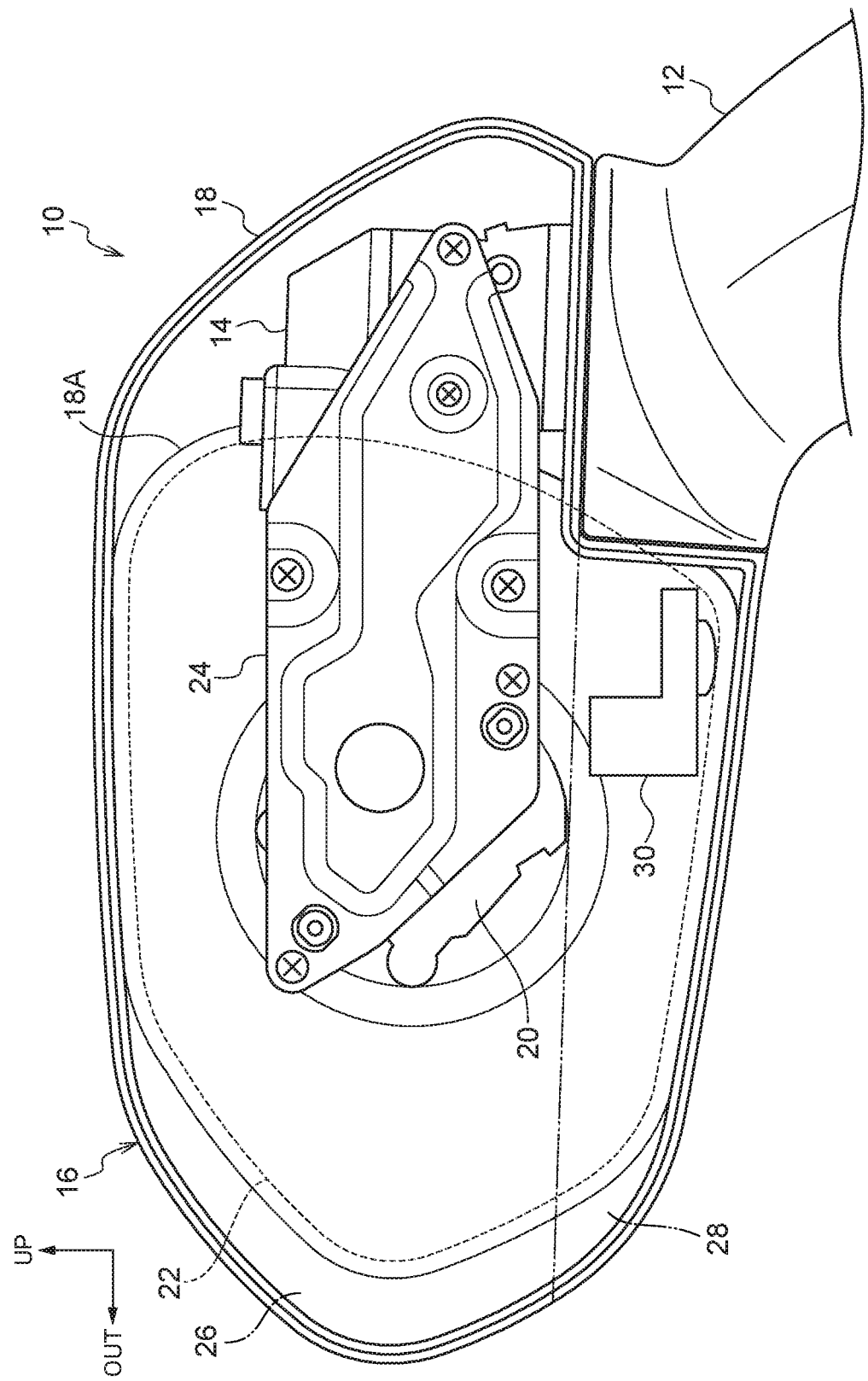
FIG. 1 is a back-face view illustrating a visor body and the like of a door mirror device according to a first exemplary embodiment of the present invention, as viewed from a vehicle front side.

FIG. 1 is a back-face view illustrating a relevant portions of a door mirror device 10 serving as a visual recognition device according to a first exemplary embodiment of the present invention, as viewed from a vehicle front side. Note that in the drawings an arrow FR indicates a vehicle forward direction, an arrow OUT indicates a vehicle width direction outside (vehicle left direction), and an arrow UP indicates upward.

The door mirror device 10 according to the present exemplary embodiment is installed to a vehicle front side end portion of an up-down direction intermediate portion of a side door (front side door, omitted in the drawings) of a vehicle (automobile), and is disposed at a vehicle outside of the side door.

As illustrated in FIG. 1, a column shaped stay 12 is provided at the door mirror device 10, with the stay 12 being fixed to the side door such that the door mirror device 10 is installed to the side door.

A stowing mechanism 14 configuring a cover body is supported at an upper side of the stay 12, with the stowing mechanism 14 capable of being operated.

A visor 16 having a substantially cuboidal box shape and configuring the cover body is supported by the stowing mechanism 14, with the visor 16 made from a resin. The stowing mechanism 14 is disposed at a vehicle width direction inside portion of the visor 16, with the visor 16 disposed at an upper side of the stay 12 and extending toward the vehicle width direction outside with respect to the stay 12.

A substantially cuboidal box shaped visor body 18 is provided at a vehicle rear side portion of the visor 16, with the inside of the visor body 18 being open toward the vehicle front side. A substantially cuboidal shaped covered recess portion 18A is formed to a vehicle rear side wall of the visor body 18, with the covered recess portion 18A being open toward the vehicle rear side.

A mirror face adjustment mechanism 20 configuring a cover body is supported by a bottom wall (vehicle front side wall) of the covered recess portion 18A of the visor body 18, with the mirror face adjustment mechanism 20 capable of being operated.

A rectangular plate shaped mirror 22 serving as a visual recognition mechanism is supported at a vehicle rear side of the mirror face adjustment mechanism 20. A back side of the mirror 22 is covered by the bottom wall of the covered recess portion 18A, and a front-face side of the mirror 22 faces toward the vehicle rear side, and is exposed at the vehicle rear side of the visor 16, This means that viewing by an occupant of the vehicle toward the vehicle rear side is assisted by the occupant viewing light reflected by the mirror 22.

A substantially rectangular plate shaped reinforcement 24 serving as a heat dissipation member configuring a cover body is disposed at a vehicle front side of the visor body 18, with the reinforcement 24 made from a metal. The reinforcement 24 is fixed to the stowing mechanism 14, to the visor body 18, and to the mirror face adjustment mechanism 20, with the reinforcement 24 reinforcing the visor body 18.

When the mirror face adjustment mechanism 20 is operated, the mirror 22 is tilted in the up-down direction and/or the vehicle width direction, and the orientation of the front-face side of the mirror 22 (orientation of the mirror face) is adjusted. When the stowing mechanism 14 has been operated, the visor 16 (including part of the stowing mechanism 14, the mirror face adjustment mechanism 20, the mirror 22, and the reinforcement 24) is swung in a vehicle front-rear direction about a vehicle width direction inside portion of the stowing mechanism 14, and the visor 16 is stowed or deployed (extended).

A curved plate shaped upper visor cover 26 is provided at a portion at a vehicle front side and upper side of the visor 16, with an outer periphery of the upper visor cover 26 fitting together with an outer periphery of the vehicle front side of the visor body 18 and covering the vehicle front side of the visor body 18.

Figure 2:
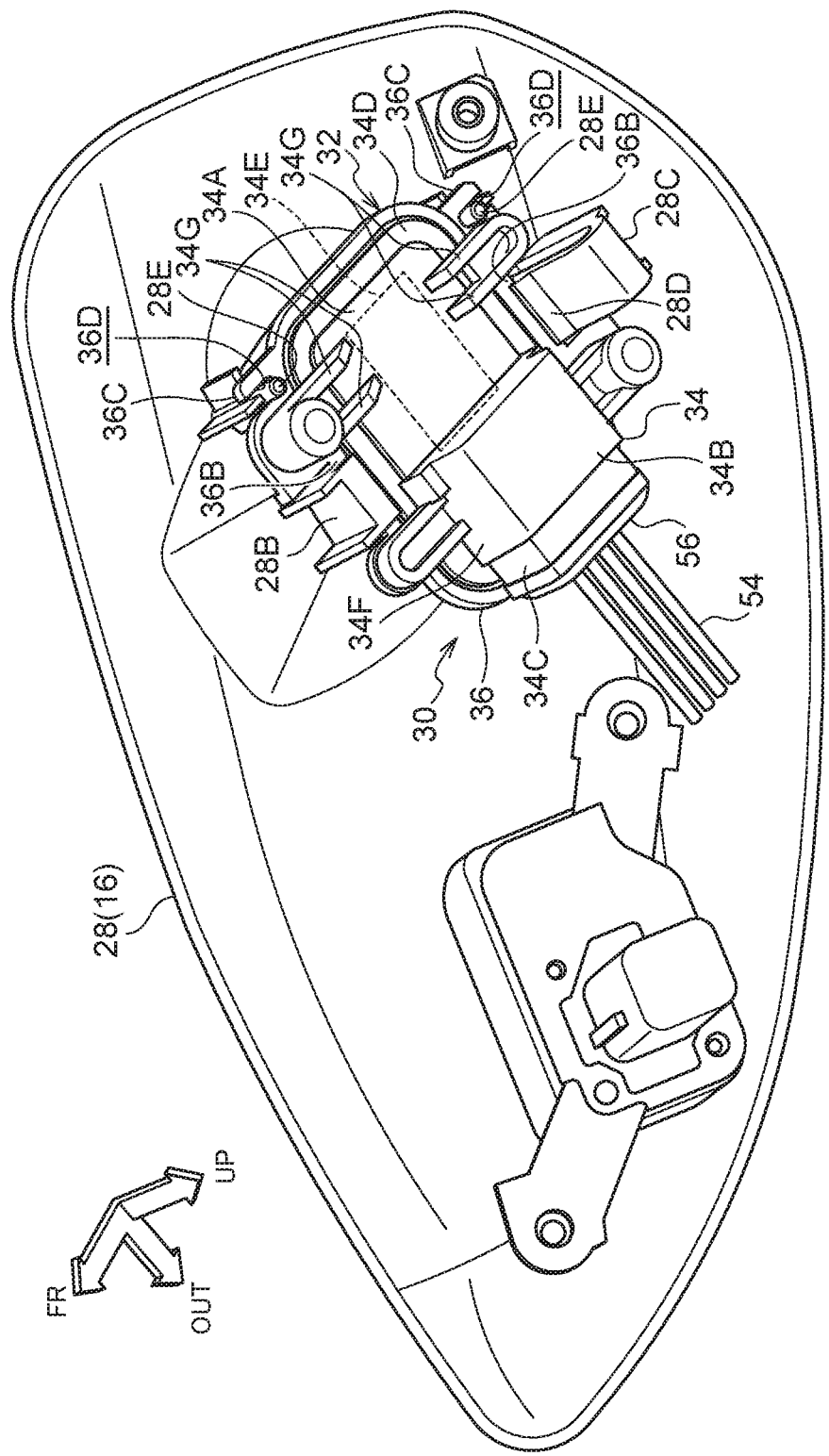
FIG. 2 is a perspective view illustrating a lower visor cover and an illumination device of a door mirror device according to a first exemplary embodiment of the present invention, as viewed from an upper side.
Figure 3:
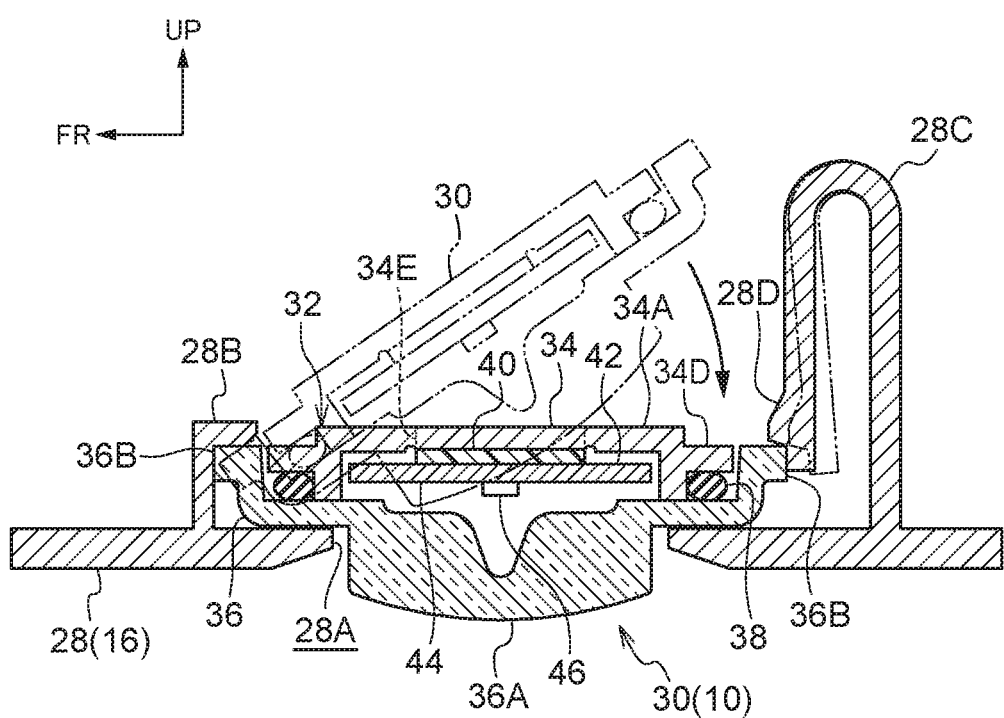
FIG. 3 is a cross-section illustrating a lower visor cover and an illumination device of a door mirror device according to a first exemplary embodiment of the present invention, as viewed from a vehicle width direction outside.
Figure 4:
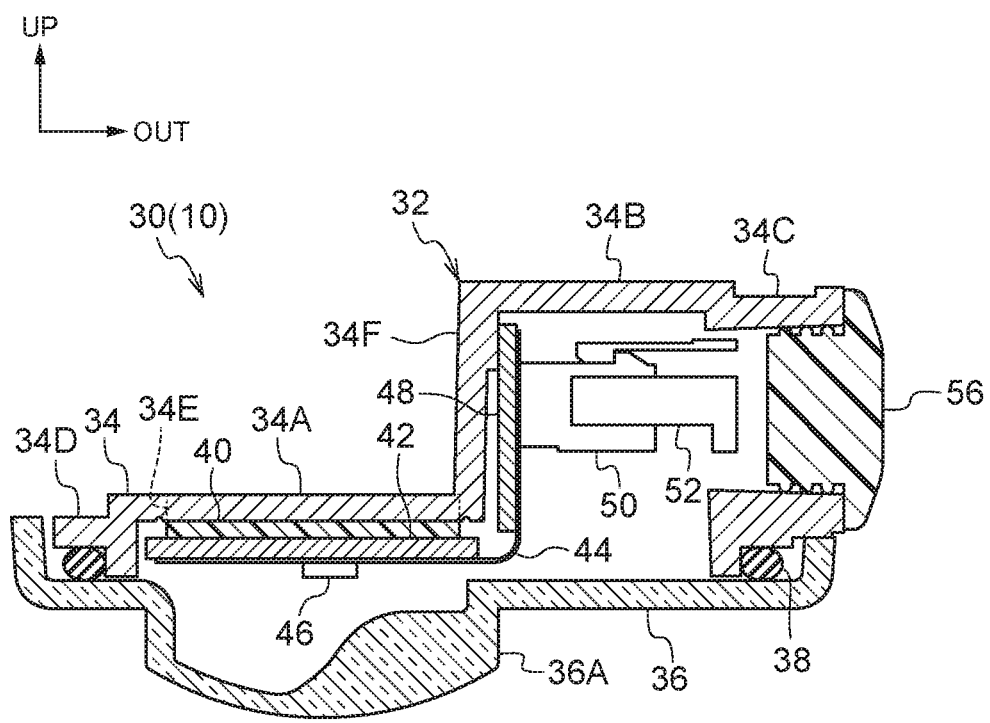
FIG. 4 is a cross-section illustrating an illumination device in a first exemplary embodiment of the present invention, as viewed from a vehicle rear side.
Figure 5:
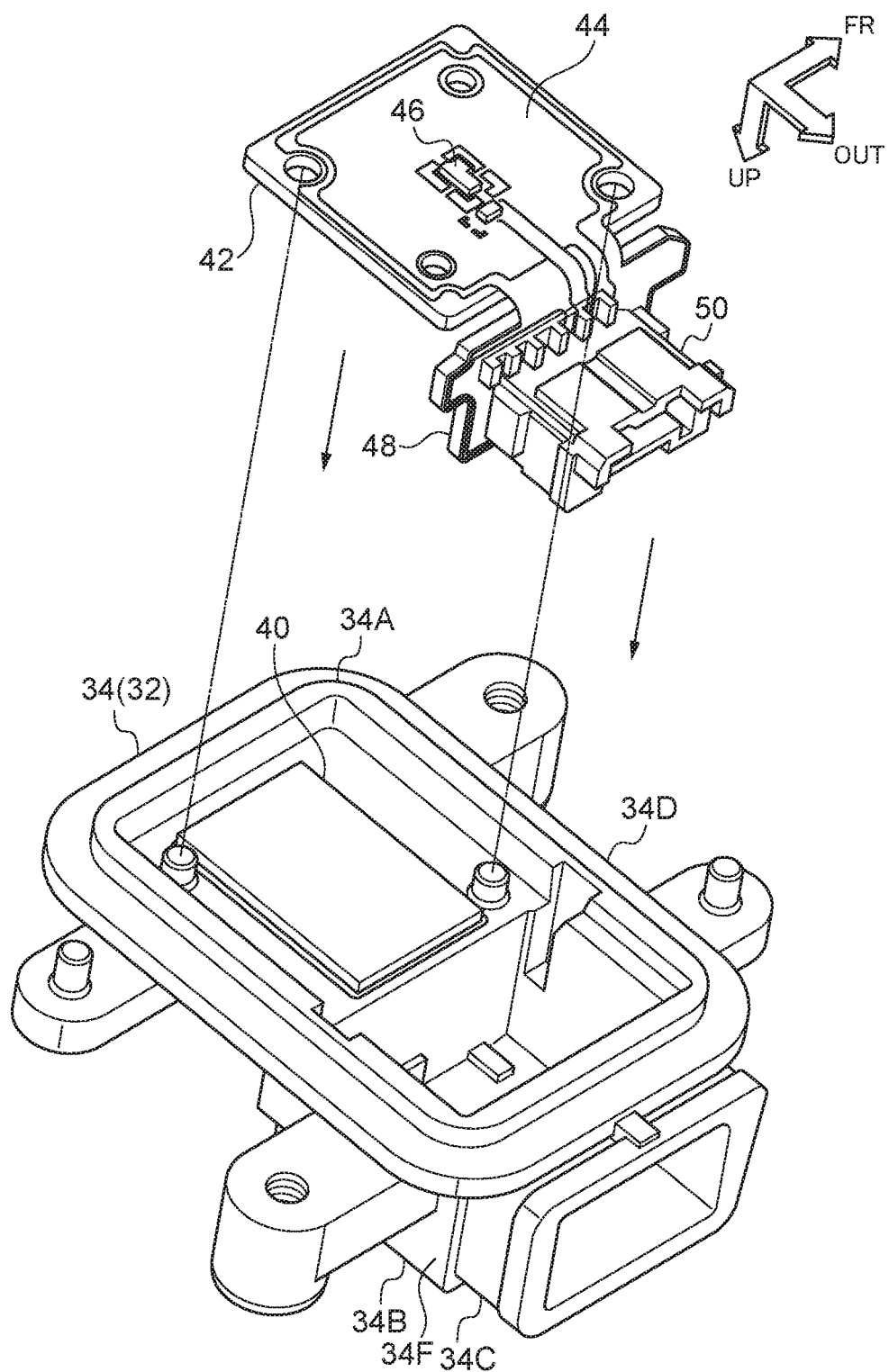
FIG. 5 is an exploded perspective view illustrating relevant portions of an illumination device of a first exemplary embodiment of the present invention, as viewed from a lower side.
Figure 6:
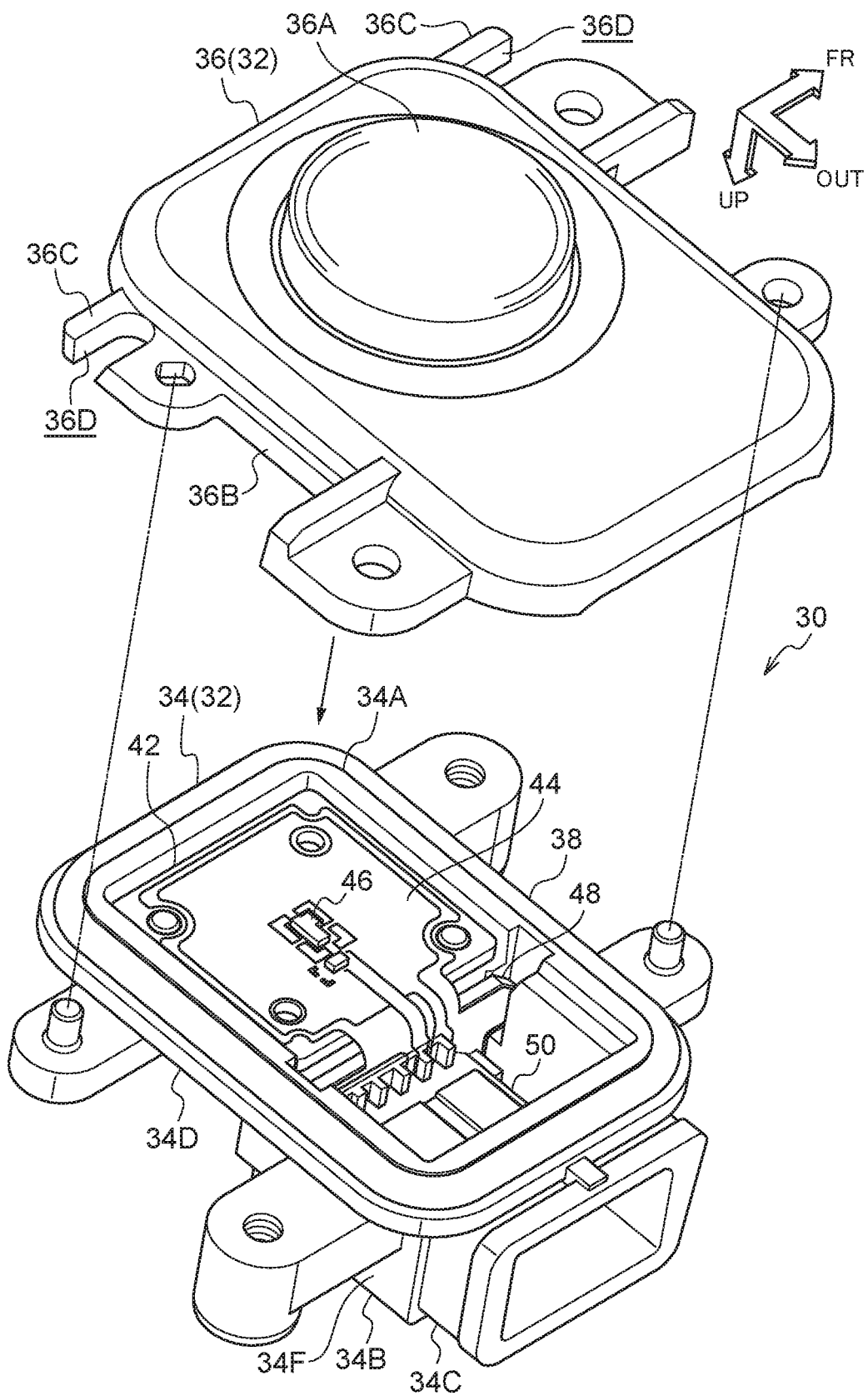
FIG. 6 is an exploded perspective view illustrating an illumination device of a first exemplary embodiment of the present invention, as viewed from a lower side.
Figure 7:
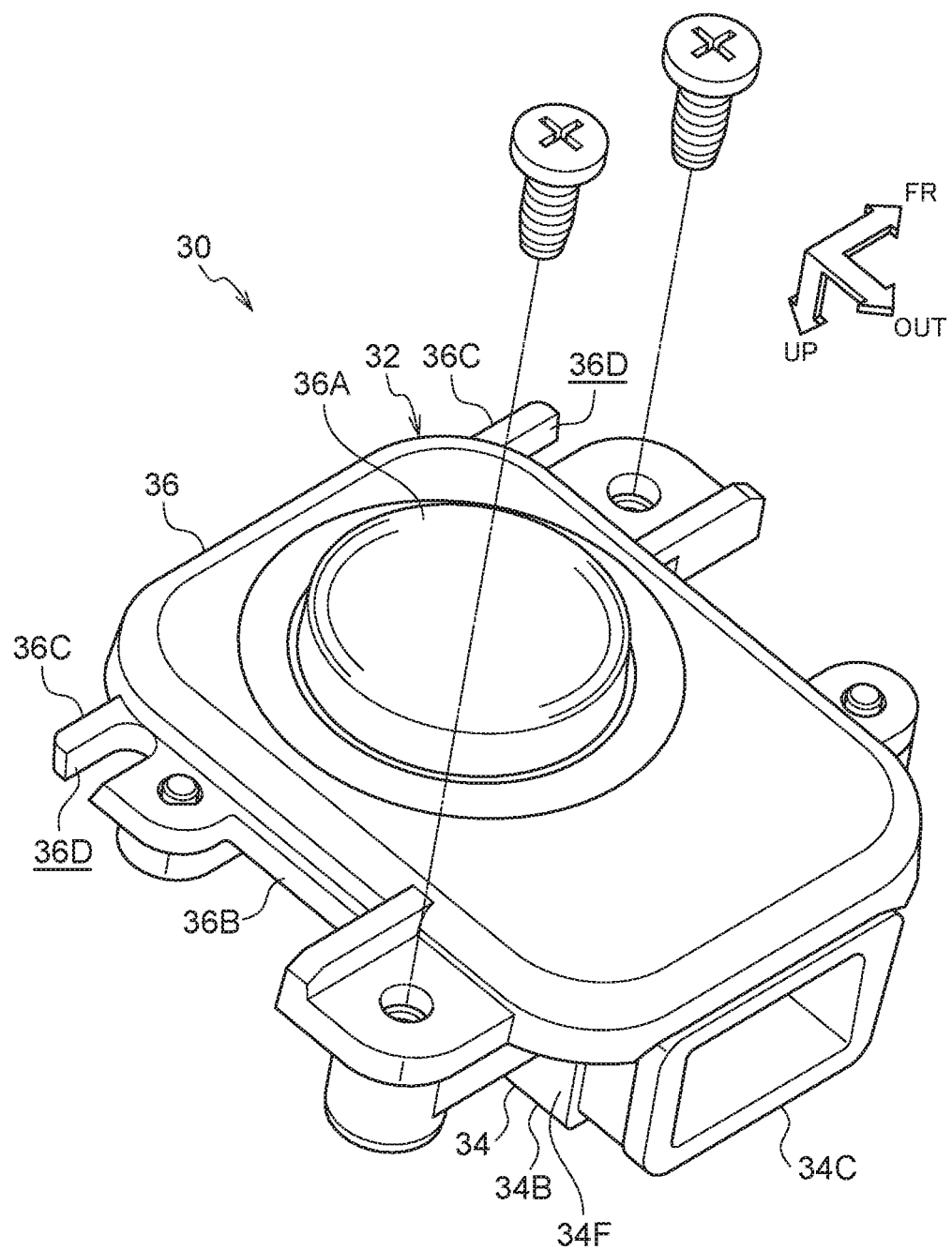
FIG. 7 is a perspective view illustrating an illumination device of a first exemplary embodiment of the present invention, as viewed from a lower side.

A curved plate shaped lower visor cover 28 (see FIG. 2) serving as a passage member is provided at a portion at a vehicle front side and lower side of the visor 16, with art outer periphery of the lower visor cover 28 fitting together with an outer periphery of the vehicle front side of the visor body 18 and the outer periphery of the upper visor cover 26, and covering the vehicle front side of the visor body 18. A circular shaped exposing hole 28A (see FIG. 3) serving as a passage portion is formed so as to penetrate through a vehicle width direction inside portion of the lower visor cover 28, with the exposing hole 28A opening the inside of the lower visor cover 28 downward.

In the lower visor cover 28, a first claw 28B (see FIG. 2 and FIG. 3) having an plate shape with an L-shaped cross-section and serving as a mounting portion is integrally formed to a vehicle front side of the exposing hole 28A, with a base end side portion of the first claw 28B projecting upward and a leading end side portion thereof projecting toward the exposing hole 28A side (vehicle rear side). In the lower visor cover 28, a second claw 28C (see FIG. 2 and FIG. 3) having a plate shape with a J-shaped cross-section and serving as a mounting portion is integrally formed to a vehicle rear side of the exposing hole 28A, with a base end side portion of the second claw 28C extending upward and a leading end side portion thereof extending downward at the exposing hole 28A side (vehicle front side) of the base end side portion. A protrusion 28D having a trapezoidal shaped cross-section is integrally formed to a vicinity of the leading end portion of the second claw 28C, with the protrusion 28D projecting toward the exposing hole 28A side (vehicle front side) and extending in the vehicle width direction. A circular column shaped restriction column 28F, (see FIG. 2) serving as a mounting portion is integrally formed to the lower visor cover 28 at a vehicle width direction inside of the first claw 28B and the second claw 28C, with the circular restriction columns 28E extending upward.

An illumination device 30 (see FIG. 2 to FIG. 7) serving as an element device is provided inside the lower visor cover 28, with the illumination device 30 housed inside the visor 16.

A housing body 32 is provided at the illumination device 30, with the housing body 32 configuring an outer periphery of the illumination device 30.

A substantially cuboidal box shaped case 34 is provided at an upper portion of the housing body 32, with the case 34 made from a metal and the interior of the case 34 opening downward. A cuboidal box shaped housing box 34A is provided at a vehicle width direction inside portion of the case 34, with an upper face of the housing box 34A configured in a planar shape. A cuboidal box shaped connection box 34B is provided at the case 34 at the vehicle width direction outside of the housing box 34A, with a lower end portion of the connection box 34B integrated to the housing box 34A and projecting upward with respect to the housing box 34A. A vehicle width direction inside wall of the connection box 34B is integrated to an upper wall of the housing box 34A, and a lower end portion of the inside of the connection box 34B is in communication with the inside of the housing box 34A, A rectangular tube shaped connection tube 34C is integrally formed to a vehicle width direction outside wall of the connection box 34B, with the inside of the connection tube 34C in communication with the inside of the connection box 34B, and the inside of the connection box 34B open toward the vehicle width direction outside. In the case 34, a rectangular ring shaped peripheral plate 34D is integrally formed from the housing box 34A at an outer periphery of a portion at a lower end portion of the connection box 34B, with the peripheral plate 34D projecting toward a peripheral outside of the case 34.

A portion of the connection box 34B further toward the upper side than the housing box 34A configures a projection portion 34F serving as a projection section, with the projection portion 34F projecting toward the upper side with respect to the housing box 34A. A pair of elongated plate shaped projection plates 34G serving as a projection section (convex portion) are respectively integrally formed to a vehicle front side portion and a vehicle rear side portion at a vehicle width direction inside portion of the housing box 34A and the peripheral plate 34D, with the projection plates 34G projecting upward from upper wall peripheral portions of the peripheral plate 34D and the housing box 34A. The projection portion 34F projects further toward the upper side than the projection plates 34G.

A lens 36 serving as a transmitting body is provided at a lower side portion of the housing body 32, with the lens 36 made from glass or made from a transparent resin and having an interior opening upward, A bottomed circular cylinder shaped lens portion 36A is integrally formed to a vehicle width direction inside portion of a lower wall of the lens 36, with the lens portion 36A projecting downward and having an interior in communication with the inside of the lens 36. A mounting plate 36B having a rectangular shaped cross-section and serving as a mounted portion is integrally formed to an upper end portion of the lens 36 at respective vehicle width direction intermediate portions of a vehicle front side face and vehicle rear side face thereof, with the mounting plates 36B projecting toward peripheral outsides of the lens 36 and extending in the vehicle width direction. At an upper end portion of the lens 36, a restricting plate 36C serving as a mounted portion is integrally formed to respective vehicle width direction inside portions of a vehicle front side face and a vehicle rear side face, with the restricting plate 36C projecting toward the peripheral outsides of the lens 36. A restricting hole 36D is formed piercing through each of the restricting plates 36C, with the restricting holes 36D extending in the vehicle front-rear direction.

The case 34 and the lens 36 are assembled together in the up-down direction, with the peripheral plate 34D of the case 34 inserted inside the lens 36. A ring shaped seal 38 made from rubber is disposed between the peripheral plate 34D of the case 34 and a lower wall of the lens 36, with the seal 38 resiliently compressed between the peripheral plate 34D of the case 34 and the lower wall of the lens 36 so as to seal between the case 34 and the lens 36.

The mounting plate 36B at the vehicle front side of the lens 36 is disposed at a lower side of the leading end side portion of the first claw 28B of the lower visor cover 28, and the mounting plate 36B at the vehicle rear side of the lens 36 is disposed at a lower side of the protrusion 28D of the second claw 28C by resilient deformation of the second claw 28C of the lower visor cover 28, with the lower wall of the lens 36 abutting the inner peripheral face of the lower visor cover 28 and being nipped in the up-down direction between the leading end side portion of the first claw 28B and the protrusion 28D of the second claw 28C, and the inner peripheral face of the lower visor cover 28. Furthermore, the mounting plate 36B at the vehicle front side abuts a portion on the base end side of the first claw 28B, and the mounting plate 36B at the vehicle rear side abuts the leading end portion of the second claw 28C by resilient deformation of the second claw 28C, and the lens 36 is nipped in the vehicle front-rear direction between the portion on the base end side of the first claw 28B and the leading end portion of the second claw 28C. Moreover, the restriction columns 28E of the lower visor cover 28 are inserted into the restricting holes 36D of the restricting plate 36C of the lens 36 and fit together therewith in the vehicle width direction, such that movement of the lens 36 in the vehicle width direction is restricted by the lower visor cover 28. The housing body 32 is thereby mounted to the lower visor cover 28, and the lens portion 36A of the lens 36 is inserted into the exposing hole 28A of the lower visor cover 28 and exposed at a lower side of the lower visor cover 28.

A rectangular sheet shaped heat dissipation seal 40 serving as an intermediate body is stuck to an upper wall lower face of the housing box 34A of the case 34, with the heat dissipation seal 40 being made, for example, from a soft foamed resin. A portion of the upper wall of the housing box 34A opposing the heat dissipation seal 40 is configured by a rectangular plate shaped coupling portion 34E, and a vehicle width direction inside wall (heat dissipation portion) of the connection box 34B of the case 34 is coupled to an upper side of a vehicle width direction outside end portion of the coupling portion 34E. The projection plates 34G of the upper wall of the housing box 34A are disposed at the outside of the coupling portion 34E, and an upper face of the coupling portion 34E further to the vehicle width direction inside than the connection box 34B is configured by a planar shape.

A rectangular plate shaped first reinforcement plate 42 serving as a support body is stuck to a lower side of the heat dissipation seal 40, with the first reinforcement plate 42 made from a metal. A one-side portion of a sheet shaped flexible circuit board 44 (a so-called flexible printed circuit (FPC)) is fixed (supported) at a lower side of the first reinforcement plate 42, with the flexible circuit board 44 made substantially from a resin. The flexible circuit board 44 is flexible, and the one-side portion of the flexible circuit board 44 is reinforced by the first reinforcement plate 42. A light emitting element 46 (for example an LED) serving as an element body is fixed to (supported at) a front-face side (lower face) of the one-side portion of the flexible circuit board 44, with a lower side of the light emitting element 46 opposing the lens portion 36A of the lens 36.

An other-side portion of the flexible circuit board 44 extends upward and is inserted inside the connection box 34B of the case 34, with an intermediate portion between the one-side portion and the other-side portion of the flexible circuit board 44 being resiliently curved. A rectangular plate shaped second reinforcement plate 48 is stuck to a back-side face (vehicle width direction inside face) of the other-side portion of the flexible circuit board 44, with the second reinforcement plate 48 made from a metal. The second reinforcement plate 48 reinforces the other-side portion of the flexible circuit board 44, the second reinforcement plate 48 is assembled to the inside of the connection box 34B such that the other-side portion of the flexible circuit board 44 is fixed inside the connection box 34B. A male connector 50 serving as a connector is fixed to the front-face side (vehicle width direction outside face) of the other-side portion of the flexible circuit board 44, with the male connector 50 electrically connected to the light emitting element 46 through the flexible circuit board 44. The entire male connector 50 is housed in the projection portion 34F of the case 34, is disposed further toward the upper side than the upper wall of the housing box 34A of the case 34, and the male connector 50 faces toward the vehicle width direction outside.

A female connector 52 serving as a counterpart connector is fitted together with and electrically connected to the male connector 50 from the vehicle width direction outside, with the female connector 52 being inserted inside the connection box 34B via the inside of the connection tube 34C of the case 34. The female connector 52 is electrically connected to wiring 54 (see FIG. 2), with the wiring 54 passing via inside the connection tube 34C, and being electrically connected to a control device (omitted in the drawings) of the vehicle through the inside of the stowing mechanism 14 and inside of the stay 12. The wiring 54 passes through a substantially rectangular column shaped bush 56 that is made from rubber, with the bush 56 fitted to the inside of the connection tube 34C in a resiliently compressed state, and sealing the inside of the connection tube 34C.

Next, description follows regarding an operation of the present exemplary embodiment.

In the door mirror device 10 configured as described above, the housing body 32 of the illumination device 30 is mounted to the lower visor cover 28 (vehicle side) at the mounting plate 36B and the restricting plate 36C of the lens 36 by the first claw 28B, the second claw 28C, and the restriction columns 28E of the lower visor cover 28. The cost is accordingly reduced compared to cases in which the housing body 32 is mounted to the lower visor cover 28 by fastening by screws. Furthermore, positioning accuracy of the lens portion 36A of the lens 36 with respect to the exposing hole 28A of the lower visor cover 28 is raised by mounting the housing body 32 (in particular the lens 36) to the lower visor cover 28.

Moreover, in the illumination device 30, the light emitting element 46 is electrically connected to the control device through the flexible circuit board 44, the male connector 50, the female connector 52, and the wiring 54, with the light emitting element 46 operating and emitting light under control of the control device. Light (for example, infrared rays) from the light emitting element 46 thereby passes through the lens portion 36A of the lens 36, and also pass through the exposing hole 28A of the lower visor cover 28, and by being irradiated below the visor 16, the ground surface below the visor 16 is illuminated.

However, in the illumination device 30, the light emitting element 46 is coupled to the coupling portion 34E of the upper wall of the housing box 34A of the case 34 through the one-side portion of the flexible circuit board 44, the first reinforcement plate 42, and the heat dissipation seal 40. This means that heat generated by operation of the light emitting element 46 is transmitted through the flexible circuit board 44, the first reinforcement plate 42, the heat dissipation seal 40, and the coupling portion 34E, and is discharged from the coupling portion 34E upward (toward the opposite side from the light emitting element 46, the first reinforcement plate 42, and the heat dissipation seal 40).

The projection portion 34F of the case 34 is projected further to an upper side of the upper wall of the housing box 34A than the coupling portion 34E, and the male connector 50 housed in the projection portion 34F is disposed at a position not opposing the upper side of the coupling portion 34E. This means that the male connector 50 and the projection portion 34F can be suppressed from opposing the upper side of the coupling portion 34E, and the male connector 50 and the projection portion 34F can be suppressed from impeding convection current of the heat discharged upward from the coupling portion 34E at an upper side of the coupling portion 34E, enabling good discharge of heat generated by the light emitting element 46 upward from the coupling portion 34E. The light emitting element 46 can thereby be suppressed from reaching a high temperature, enabling misoperation of the light emitting element 46 to be suppressed, and also enabling a large current to be supplied to the light emitting element 46.

Furthermore, the male connector 50 is disposed inside the connection box 34B of the case 34, and the connection direction of the male connector 50 to the female connector 52 is toward the vehicle width direction outside, and is not facing toward the side of the coupling portion 34E (the side of the light emitting element 46, the first reinforcement plate 42, and the heat dissipation seal 40). This means that the male connector 50 and the female connector 52 (connector portion) can be suppressed from opposing the upper side of the coupling portion 34E, enabling the male connector 50 and the female connector 52 to be suppressed from impeding convection current of the heat discharged upward from the coupling portion 34E at the upper side of the coupling portion 34E, enabling good discharge of heat generated by the light emitting element 46 upward from the coupling portion 34E.

Moreover, the mounting plate 36B and the restricting plate 36C are provided at the lens 36 of the housing body 32, with the mounting plate 36B and the restricting plate 36C disposed at positions not opposing the upper side of the coupling portion 34E of the housing body 32, This enables the mounting plate 36B and the restricting plate 36C to be suppressed from impeding convection current of the heat discharged upward from the coupling portion 34E at the upper side of the coupling portion 34E, enabling even better discharge of heat generated by the light emitting element 46 upward from the coupling portion 34E.

Furthermore, the coupling portion 34E of the housing body 32 is separated from the stowing mechanism 14, the visor body 18 and the upper visor cover 26 (except the lower visor cover 28) of the visor 16, the mirror face adjustment mechanism 20, with the reinforcement 24, and the first claw 28B, the second claw 28C, and the restriction columns 28E of the lower visor cover 28 being disposed at positions not opposing the upper side of the coupling portion 34E. This means that the first claw 28B, the second claw 28C, and the restriction columns 28E can be suppressed from impeding convection current of the heat discharged upward from the coupling portion 34E at the upper side of the coupling portion 34E, enabling even better discharge of heat generated by the light emitting element 46 upward from the coupling portion 34E. Furthermore, heat discharged upward from the coupling portion 34E can be suppressed from being transmitted to the first claw 28B, the second claw 28C, and the restriction columns 28E, enabling damage by this heat to the first claw 28B, the second claw 28C, and the restriction columns 28E to be suppressed from occurring.

Moreover, members at the visor 16 side (including the first claw 28B, the second claw 28C, and the restriction columns 28E) do not intrude into (nothing is provided in) a space inside the visor 16 at the upper side of the coupling portion 34E and at the vehicle width direction inside of the projection portion 34F (the coupling portion 34E side), at the vehicle rear side (coupling portion 34E side) of the projection plates 34G on the vehicle front side, and at the vehicle front side (coupling portion 34E side) of the projection plates 34G at the vehicle rear side, with this space moreover being open toward the upper side, to the vehicle front side, the vehicle rear side, and the vehicle width direction inside. This means that convection current of the heat discharged upward from the coupling portion 34E at the upper side of the coupling portion 34E can be effectively suppressed from being impeded, and the heat generated by the light emitting element 46 can be effectively discharged upward from the coupling portion 34E.

Furthermore, a vehicle width direction inside wall of the connection box 34B is coupled to an upper side of the vehicle width direction outside end portion of the coupling portion 34E. This means that heat generated by the light emitting element 46 can be transmitted from the coupling portion 34E to the vehicle width direction inside wall of the connection box 34B, can be discharged from the vehicle width direction inside wall of the connection box 34B toward the upper side of the coupling portion 34E, enabling the light emitting element 46 to be further suppressed from reaching a high temperature.

Second Exemplary Embodiment

Figure 8:
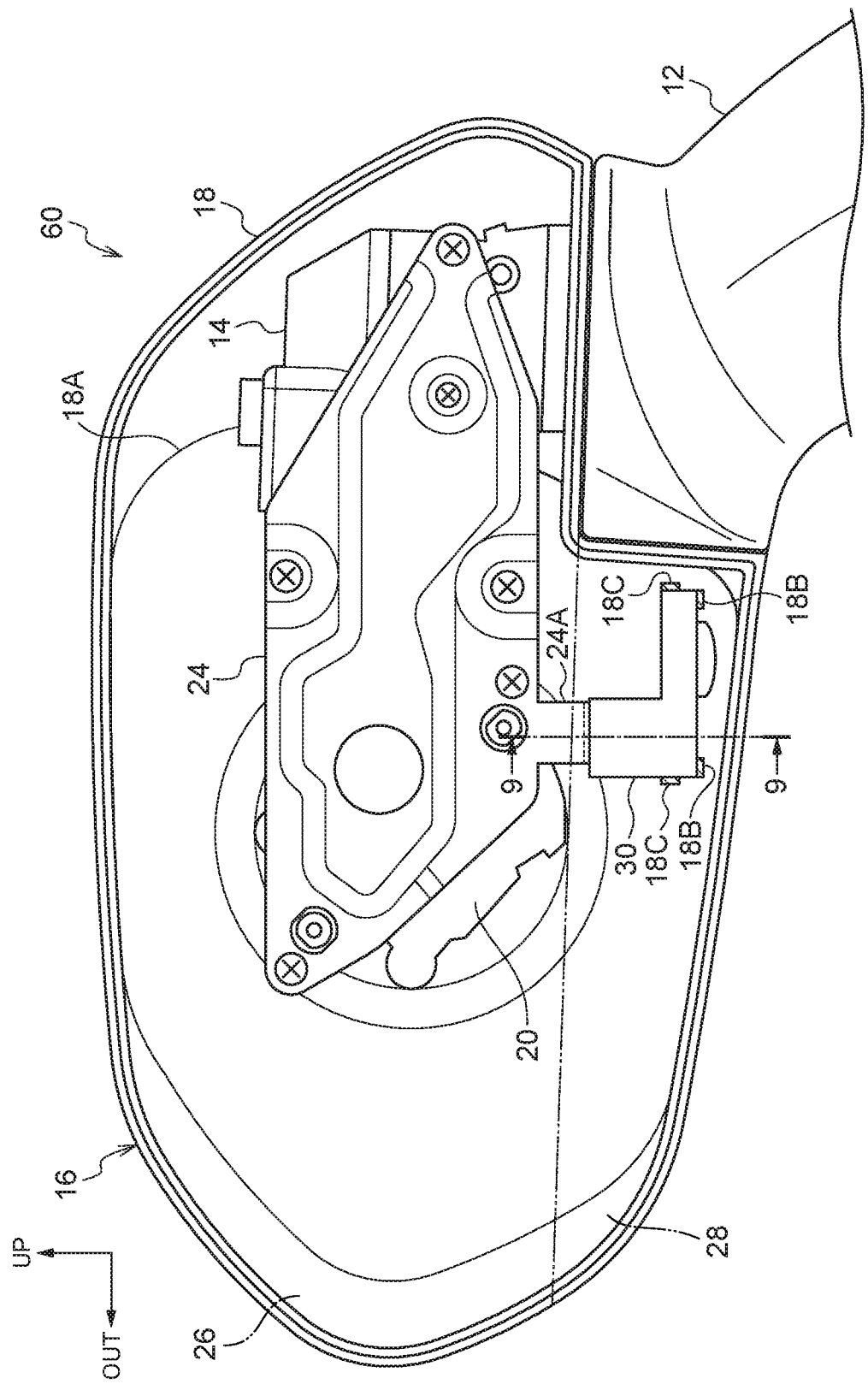
FIG. 8 is a back-face view illustrating a visor body and the like of a door mirror device according to a second exemplary embodiment of the present invention, as viewed from a vehicle front side.

FIG. 8 illustrates a back face view of relevant portions of a door mirror device 60 serving as a visual recognition device according to a second exemplary embodiment of the present invention, as viewed from the vehicle front side.

The door mirror device 60 according to the present exemplary embodiment is configured substantially similarly to the first exemplary embodiment described above, however it differs in the following manner.

The door mirror device 60 according to the present exemplary embodiment lacks the first claw 28B, the second claw 28C, and the restriction columns 28E of the first exemplary embodiment at the lower visor cover 28 of the visor 16.

Figure 9:
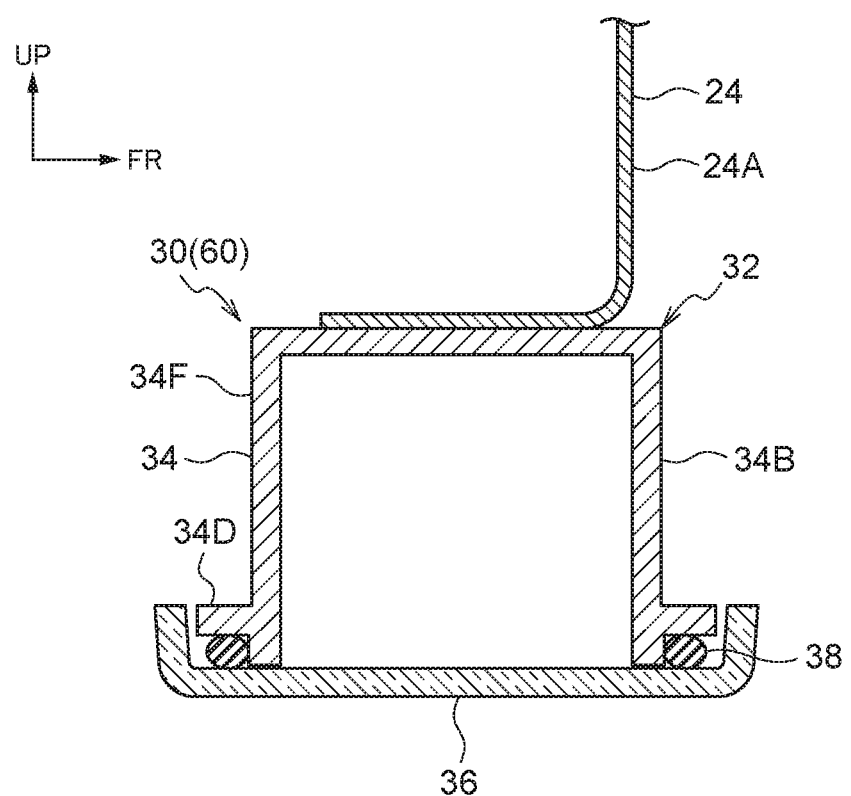
FIG. 9 is a cross-section (cross-section taken along line 9-9 of FIG. 8) illustrating relevant portions of a door mirror device according to a second exemplary embodiment of the present invention, as viewed from the vehicle width direction outside.

As illustrated in FIG. 8, inside the visor 16, a plate shaped upper guide 24A (see FIG. 9) having an L-shaped cross-section and serving as a mounting portion is integrally formed to an end portion at a vehicle width direction outside and lower side of the reinforcement 24, with a base end side portion of the upper guide 24A extending downward and a leading end side portion of the tipper guide 24A extending toward the vehicle rear side. A vehicle width direction outside portion (upper wall of the connection box 34B of the case 34 (mounted portion)) of the housing body 32 of the illumination device 30 is disposed at a lower side of the leading end side portion of the upper guide 24A.

At the visor body 18 of the visor 16, elongated plate shaped lower guides 18B serving as mounting portions are integrally formed at a lower side of both vehicle width direction end portions (both vehicle width direction end portions of a lower wall of the lens 36 (mounted portions)) of a lower face of the housing body 32, with the lower guides 18B extending toward the vehicle front side. The housing body 32 is nipped in the up-down direction between the pair of lower guides 18B and the leading end side portion of the upper guide 24A.

At the visor body 18, elongated plate shaped center guides 18C serving as mounting portions are integrally formed at the outside of a lower side portion of the housing body 32 in each vehicle width direction (outside of both vehicle width direction side walls of the lens 36 (mounted portions)), with the center guides 18C extending toward the vehicle front side. A lower side portion of the housing body 32 is nipped in the vehicle width direction between the pair of center guides 18C.

A vehicle rear side end (mounted portion) and a vehicle front side end (mounted portion) of the lower side portion (the lens 36) of the housing body 32 are respectively abutted against a bottom wall (mounting portion) of the covered recess portion 18A of the visor body 18 and an inner peripheral face (mounting portion) of the lower visor cover 28, with the lower side portion of the housing body 32 nipped in the vehicle front-rear direction between the bottom wall of the covered recess portion 18A and the inner peripheral face of the lower visor cover 28.

Due to the above, the housing body 32 is mounted inside the visor 16 (to the vehicle side) at the upper wall of the connection box 34B and at the lens 36 by the upper guide 24A, the pair of lower guide 18B, the pair of center guides 18C, the visor body 18, and the lower visor cover 28.

When the housing body 32 is being mounted inside the visor 16, the housing body 32 is moved toward the vehicle rear side with respect to the visor body 18 while being guided by the leading end side portion of the upper guide 24A, the pair of lower guides 18B, and the pair of center guides 18C, and the housing body 32 is installed to the visor body 18. The lower visor cover 28 is then assembled to the visor body 18, such that the housing body 32 is mounted inside the visor 16. Moreover, due to the housing body 32 being installed to the visor body 18 by the upper guide 24A the pair of lower guides 18B and the pair of center guides 18C, the male connector 50 of the housing body 32 being disposed at the visor body 18 where the female connector 52 is to be disposed, facilitating an operation to connect the female connector 52 to the male connector 50.

Thus in the present exemplary embodiment too, similar operation and advantageous effects can be exhibited to those of the first exemplary embodiment.

Furthermore, the upper wall of the connection box 34B of the housing body 32 (case 34) of the illumination device 30 is coupled to a lower side of the leading end side portion of the upper guide 24A of the reinforcement 24. This means that heat generated by the light emitting element 46 can be transmitted from the coupling portion 34E to the metal reinforcement 24 via the connection box 34B and can be discharged from the reinforcement 24, enabling the light emitting element 46 to be further suppressed from reaching a high temperature.

Third Exemplary Embodiment

Figure 10:
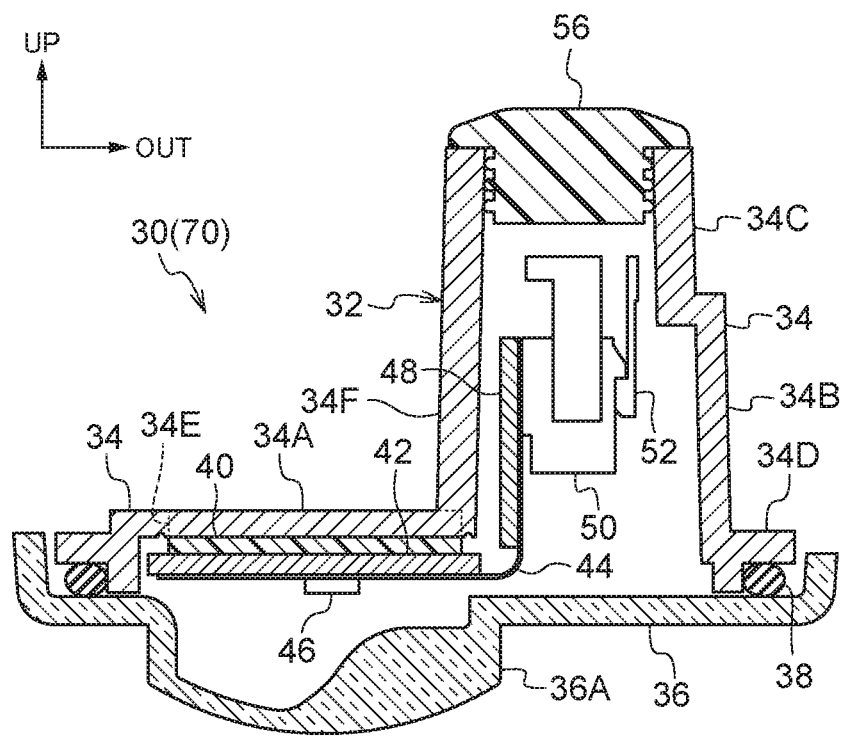
FIG. 10 is a cross-section illustrating an illumination device of a third exemplary embodiment of the present invention, as viewed from a vehicle rear side.

FIG. 10 illustrates a cross-section of an illumination device 30 of a door mirror device 70 serving as a visual recognition device according to a third exemplary embodiment of the present invention, as viewed from the vehicle rear side.

The door mirror device 70 according to the present exemplary embodiment is configured substantially similarly to the first exemplary embodiment described above, however it differs in the following manner.

As illustrated in FIG. 10 in the door mirror device 70 according to the present exemplary embodiment, at a housing body 32 of the illumination device 30, a connection tube 34C is integrally formed to an upper wall of a connection box 34B of a case 34, the inside of the connection tube 34C is in communication with the inside of the connection box 34B, and the inside of the connection box 34B is open upward.

A male connector 50 at the other-side portion of the flexible circuit board 44 faces toward the upper side, and the female connector 52 is fitted together with and electrically connected to the male connector 50 from the upper side. This means that the connection direction of the male connector 50 to the female connector 52 is not toward the coupling portion 34E side (the side of the light emitting element 46, the first reinforcement plate 42, and the heat dissipation seal 40).

The present exemplary embodiment is also able to exhibit similar operation and advantageous effects to those of the first exemplary embodiment.

Note that the illumination device 30 of the present exemplary embodiment may also be applied to the second exemplary embodiment described above. In such cases, a bush 56 (mounted portion) of the housing body 32 of the illumination device 30 is disposed at the lower side of the leading end side portion of the upper guide 24A of the reinforcement 24. Furthermore, the wiring 54 penetrating through the bush 56 is passes to a side of the leading end side portion of the upper guide 24A or penetrates through the leading end side portion of the upper guide 24A.

Moreover, in the first exemplary embodiment to the third exemplary embodiment described above, the vehicle width direction inside wall of the connection box 34B is coupled to an upper side of the vehicle width direction outside end portions of the coupling portion 34E. However, a configuration may be adopted in which the vehicle width direction inside wall of the connection box 34B is not coupled to the upper side of the vehicle width direction outside end portions of the coupling portion 34E, and the vehicle width direction inside wall of the connection box 34B is disposed at the vehicle width direction outside of the coupling portion 34E. In such cases the entire upper surface of the coupling portion 34E may be a planar shape.

Furthermore, in the first exemplary embodiment to the third exemplary embodiment, the projection plates 34G project toward the upper side from the upper wall of the peripheral plate 34D and from the housing box 34A of the case 34. However, a configuration may be adopted in which the projection plates 340 project upward from the peripheral plate 34D of the case 34, and do not project upward from the upper wall of the housing box 34A of the case 34.

Moreover, in the first exemplary embodiment to the third exemplary embodiment described above, a configuration may be adopted in which a projection plate 34G (heat dissipation portion), for example, projects upward from the coupling portion 34E. In such cases, the projection portion 34F of the case 34 projects further upward than the projection plate 34G.

Moreover, in the first exemplary embodiment to the third exemplary embodiment described above, the entire male connector 50 is disposed further toward the upper side than the coupling portion 34E. However, configuration may be adopted in which a portion of the male connector 50 is disposed further upward than the coupling portion 34E.

Furthermore, in the first exemplary embodiment to the third exemplary embodiment, the first reinforcement plate 42 (support body) is coupled to the coupling portion 34E of the upper wall of the housing box 34A of the housing body 32 through the heat dissipation seal 40. However, the support body may be coupled to the coupling portion 34E of the upper wall of the housing box 34A of the housing body 32 through grease (a lubricant) serving as an intermediate body. Furthermore, the support body may be directly coupled to the coupling portion 34E of the upper wall of the housing box 34A of the housing body 32.

Moreover, in the first exemplary embodiment to the third exemplary embodiment described above, the one-side portion of the flexible circuit board 44 is fixed to the metal first reinforcement plate 42 (support body). However, a rigid circuit board (support body) made substantially from metal may be provided instead of the first reinforcement plate 42 and the one-side portion of the flexible circuit board 44.

Furthermore, in the first exemplary embodiment to the third exemplary embodiment described above, the other-side portion of the flexible circuit board 44 is fixed to the metal second reinforcement plate 48, However, a rigid circuit board (support body) made substantially from metal may be provided instead of the second reinforcement plate 48 and the other-side portion of the flexible circuit board 44.

Moreover, in the first exemplary embodiment to the third exemplary embodiment described above, the element body is configured by the light emitting element 46, and the element device is configured by the illumination device 30. However, the element body may be configured by an imaging element (for example, a CCD), and the element device may be configured by an imaging device. In such cases, the imaging element is operated under control of the control device, and the imaging element captures an image of light that has been transmitted from the lower side of the lens portion 36A of the lens 36 and passed through from the lower side of the exposing hole 28A of the lower visor cover 28, so as to capture an image of a lower side of the visor 16.

Furthermore, in the first exemplary embodiment to the third exemplary embodiment described above, the visual recognition device is configured by the door mirror devices 10, 60, 70. However, the visual recognition device may be provided externally to the vehicle.

Moreover, in the first exemplary embodiment to the third exemplary embodiment described above, the visual recognition mechanism is configured by the mirror 22. However, the visual recognition mechanism may be configured by a camera. In such cases, for example, the camera is electrically connected to the control device, and a monitor inside a vehicle cabin is electrically connected to the control device. An image captured by the camera is thereby displayed on the monitor under control of the control device, and visual recognition of an occupant is assisted by the occupant checking the image displayed on the monitor.

The entire content of the disclosure of Japanese Patent Application No, 2020-196329 filed on Nov. 26, 2020 is incorporated by reference in the present specification.

EXPLANATION OF THE REFERENCE NUMERALS

10 . . . door mirror device (visual recognition device), 14 . . . stowing mechanism (cover body), 16 . . . visor (cover body), 18B . . . lower guide (mounting portion), 18C . . . center guide (mounting portion), 20 . . . mirror face adjustment mechanism (cover body), 22 . . . mirror (visual recognition mechanism), 24 . . . reinforcement (cover body), 24A . . . upper guide (mounting portion), 28 . . . lower visor cover (passage member), 28A . . . exposing hole (passage portion), 28B . . . first claw (mounting portion), 28C . . . second claw (mounting portion), 28E . . . restriction column (mounting portion), 30 . . . illumination device (element device), 32 . . . housing body, 34E . . . coupling portion, 34F . . . projection portion (projection section), 34G . . . projection plate (projection section), 36 . . . lens (transmitting body), 36B . . . mounting plate (mounted portion), 36C . . . restricting plate (mounted portion), 42 . . . first reinforcement plate (support body), 46 . . . light emitting element (element body), 50 . . . male connector (connector), 60 . . . door mirror device (visual recognition device), 70 . . . door mirror device (visual recognition device).

The invention claimed is:

1. An element device comprising:
   a housing body provided at a vehicle;
   an element body that emits light or captures an image and that is housed in the housing body;
   a support body that is made from a metal and that supports the element body;
   a coupling portion that configures the housing body, and that is made from a metal and coupled to the support body at an opposite side from the element body;
   a projection portion that is provided at the housing body and that projects further than the coupling portion toward the opposite side from the support body; and
   a connector that is housed in the projection portion and that is disposed at a position not opposing an opposite side of the coupling portion from the support body, is electrically connected to the element body, and is also electrically connected to a vehicle side.

2. The element device of claim 1, wherein an electrical connection direction of the connector to the vehicle side is not toward a side of the coupling portion.

3. The element device of claim 1, further comprising a mounted portion provided at the housing body, disposed at a position not opposing an opposite side of the coupling portion from the support body, and configured to be mounted to the vehicle side.

4. The element device of claim 3, further comprising a transmitting body that transmits light, the transmitting body configuring the housing body and covering an opposite side of the element body from the support body, and the mounted portion being provided at the transmitting body.

5. The element device of claim 1, wherein the projection portion is coupled to the coupling portion.

6. The element device of claim 1, further comprising a heat dissipation portion provided at the housing body, projecting from the coupling portion toward an opposite side from the support body, and having a projection amount toward the opposite side from the support body that is smaller than that of the projection portion.

7. A visual recognition device comprising:
   a cover body that is provided externally to a vehicle, and that is provided with a passage member including a passage portion;
   a visual recognition mechanism that is covered by the cover body and that assists visual recognition of an occupant of the vehicle;
   an element device that is provided with:
      a housing body housed in the cover body,
      an element body housed in the housing body, and emitting light or capturing an image for light able to pass via the passage portion to or from outside of the cover body,
      a support body made from a metal and supporting the element body, and
      a coupling portion configuring the housing body, made from a metal, coupled to the support body at an opposite side from the element body, and also separated from the cover body other than the passage member; and
   a mounting portion that is provided at the passage member, that is disposed at a position not opposing an opposite side of the coupling portion from the support body, and at which the housing body is mounted.

8. The visual recognition device of claim 7, wherein members at a side of the cover body do not ingress into a space that is on the opposite side of the coupling portion from the support body and that is on a coupling portion side of a projection section of the housing body projecting further than the coupling portion toward the opposite side from the support body.

9. The visual recognition device of claim 7, further comprising a heat dissipation member that is provided at the cover body, and that is made from a metal and is coupled to the coupling portion.

10. A visual recognition device comprising:
    a cover body that is provided externally to a vehicle, and that is provided with a passage member including a passage portion;
    a visual recognition mechanism that is covered by the cover body and that assists visual recognition of an occupant of the vehicle;

an element device that is provided with:
- a housing body housed in the cover body,
- an element body housed in the housing body, and emitting light or capturing an image for light able to pass via the passage portion to or from outside of the cover body,
- a support body made from a metal and supporting the element body, and
- a coupling portion configuring the housing body, made from a metal, coupled to the support body at an opposite side from the element body, and also separated from the cover body other than the passage member; and a mounting portion that is provided at the cover body other than the passage member, that is disposed at a position not opposing an opposite side of the coupling portion from the support body, and at which the housing body is mounted.

11. The visual recognition device of claim 10, wherein members at a side of the cover body do not ingress into a space that is on the opposite side of the coupling portion from the support body and that is on a coupling portion side of a projection section of the housing body projecting further than the coupling portion toward the opposite side from the support body.

12. The visual recognition device of claim 10, further comprising a heat dissipation member that is provided at the cover body, and that is made from a metal and is coupled to the coupling portion.

* * * * *